US012439219B2

(12) United States Patent
Harada et al.

(10) Patent No.: US 12,439,219 B2
(45) Date of Patent: Oct. 7, 2025

(54) SIGNAL PROCESSING DEVICE AND SIGNAL PROCESSING METHOD

(71) Applicant: Panasonic Intellectual Property Corporation of America, Torrance, CA (US)

(72) Inventors: Akira Harada, Kanagawa (JP); Hiroyuki Ehara, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 238 days.

(21) Appl. No.: 18/271,795

(22) PCT Filed: Oct. 15, 2021

(86) PCT No.: PCT/JP2021/038178

§ 371 (c)(1),
(2) Date: Jul. 11, 2023

(87) PCT Pub. No.: WO2022/153632

PCT Pub. Date: Jul. 21, 2022

(65) Prior Publication Data

US 2024/0064483 A1 Feb. 22, 2024

Related U.S. Application Data

(60) Provisional application No. 63/141,198, filed on Jan. 25, 2021, provisional application No. 63/138,648, filed on Jan. 18, 2021.

(30) Foreign Application Priority Data

May 6, 2021 (JP) ................................ 2021-078567

(51) Int. Cl.
*H04R 5/00* (2006.01)
*H04S 7/00* (2006.01)

(52) U.S. Cl.
CPC ..................................... *H04S 7/30* (2013.01)

(58) Field of Classification Search
CPC ........................................................ H04S 7/30
(Continued)

(56) References Cited

U.S. PATENT DOCUMENTS

| | | | | |
|---|---|---|---|---|
| 2013/0301835 | A1* | 11/2013 | Briand | H04S 7/00 381/17 |
| 2018/0197552 | A1 | 7/2018 | Fuchs et al. | |
| 2020/0286495 | A1 | 9/2020 | Norvell et al. | |

FOREIGN PATENT DOCUMENTS

| | | |
|---|---|---|
| JP | 2020-060788 | 4/2020 |
| JP | 2020-065283 | 4/2020 |

OTHER PUBLICATIONS

International Search Report (ISR) from International Searching Authority (Japan Patent Office) in International Pat. Appl. No. PCT/JP2021/038178, dated Jan. 11, 2022, together with an English language translation.

* cited by examiner

*Primary Examiner* — Ammar T Hamid
(74) *Attorney, Agent, or Firm* — Greenblum & Bernstein, P.L.C.

(57) ABSTRACT

This signal processing device is provided with a detection circuit for detecting a temporal variation in a time difference between channels of a stereo signal, and a control circuit for controlling the degree of smoothing of an inter-channel cross correlation function on the basis of the temporal variation in the time difference between the channels.

8 Claims, 9 Drawing Sheets

(58) Field of Classification Search
USPC ........................................................ 381/1, 2
See application file for complete search history.

SIGNAL PROCESSING DEVICE AND SIGNAL PROCESSING METHOD

TECHNICAL FIELD

The present disclosure relates to a signal processing apparatus and a signal processing method.

BACKGROUND ART

There is an encoding technique for a stereo speech/acoustic signal (hereinafter may also be referred to as a stereo signal), for example (see, e.g., Patent Literature (hereinafter, referred to as PTL) 1).

CITATION LIST

Patent Literature

PTL 1

Japanese Patent Application Laid Open No. 2020-60788

SUMMARY OF INVENTION

There is scope for further study, however, on an encoding method for a stereo signal when a sound source moves.

One non-limiting and exemplary embodiment facilitates providing a signal processing apparatus and a signal processing method each capable of improving the encoding performance for a stereo signal when a sound source moves.

A signal processing apparatus according to an exemplary embodiment of the present disclosure includes: detection circuitry, which, in operation, detects a time change of an inter-channel time difference of a stereo signal; and control circuitry, which, in operation, controls a degree of smoothing of an inter-channel cross correlation, based on the time change of the inter-channel time difference.

It should be noted that general or specific embodiments may be implemented as a system, an apparatus, a method, an integrated circuit, a computer program, a storage medium, or any selective combination thereof.

According to an exemplary embodiment of the present disclosure, it is possible to improve the encoding performance for a stereo signal when a sound source moves.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Hereinafter, embodiments of the present disclosure will be described in detail with reference to the accompanying drawings.

Binaural cue coding (BCC) is one example of encoding for a stereo signal, for example. In the binaural cue coding, a stereo signal is parameterized by using binaural cues, such as an inter-channel level difference (ILD), an inter-channel cross correlation (ICC), and an inter-channel time difference (ITD), for a stereo signal including an L-channel (Left channel or L-ch) and an R-channel (Right channel or R-ch).

For example, the inter-channel time difference (ITD) of the stereo signal is a parameter for a difference in arrival time of sound between the L-channel and the R-channel. For example, the ITD may be estimated based on a time lag for a peak position of an ICC in time domain, obtained by performing inverse Fast Fourier Transform (IFFT) on an inter-channel cross correlation (ICC) in frequency domain that is determined on the basis of a Fast Fourier Transform (FFT) spectrum of a pair of channel signals included in the stereo signal.

In order to improve the estimation accuracy of an ITD (may also be referred to as ITD estimation accuracy) or to achieve stable estimation, there is a method to apply smoothing processing between frames for an ICC, based on a degree of spectral flatness (Spectral Flatness Measurement (SFM)), for example (e.g., see PTL 1). For example, the stronger tonality or periodicity of an input signal is, the lower the SFM is. By way of example, in PTL 1, when an input signal has a stronger tonality (e.g., in the case of lower SFM) in the encoding apparatus, stronger smoothing processing is applied to an ICC. In other words, when the input signal has the stronger tonality, ICC data on a previous frame is more likely to be reflected in the current frame. This can improve the determination accuracy of a peak position of the ICC in time domain corresponding to a time lag, thereby improving the ITD estimation accuracy.

Here, for example, even when an actual ITD varies depending on motion (e.g., movement) of a sound source of a stereo signal, the stronger the applied smoothing processing is, the less likely the estimated ITD (e.g., peak position of ICC in time domain) is to vary due to the smoothing between frames. Thus, for example, the application of the smoothing processing may reduce the accuracy in tracking of a moving sound source (i.e., ITD estimation accuracy).

In an exemplary embodiment of the present disclosure, a description will be given of a method of improving the ITD estimation accuracy and thereby improving the encoding performance when a sound source of a stereo signal moves.

[Exemplary Configuration of Transmission System for Speech/Acoustic Signal]

Figure 1:
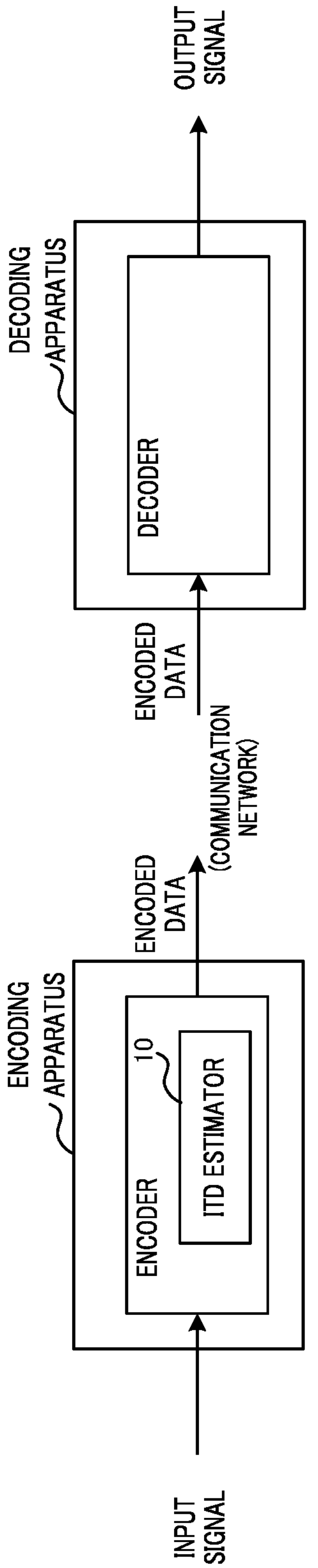
FIG. 1 illustrates an exemplary configuration of a transmission system for a speech/acoustic signal.

FIG. 1 illustrates an exemplary configuration of a transmission system for a speech signal or an acoustic signal (e.g., referred to as a speech acoustic signal).

The transmission system illustrated in FIG. 1 may include, for example, an encoding apparatus and a decoding apparatus.

[Exemplary Configuration of Encoding Apparatus]

The encoding apparatus may include, for example, an input device such as a microphone (not illustrated), an A/D converter (not illustrated), and an encoder.

The input device, for example, outputs a speech acoustic signal (analog signal), which is to be inputted, to the A/D converter. The A/D converter, for example, converts the inputted analogue signal into a digital signal and then outputs the digital signal to the encoder. Incidentally, in the encoding apparatus, at least one of the input device and the A/D converter may be provided in plurality (e.g., two) in order to handle a stereo signal.

The encoder may include, for example, a converter (e.g., FFT unit) that converts a signal in time domain into a signal in frequency domain, a stereo information extractor, a down-mixer, and an encoding unit (none of them is illustrated).

The converter converts, for example, for each channel, a stereo signal (e.g., L-channel signal and R-channel signal) that is inputted to the encoder into data in frequency domain (e.g., FFT spectrum) from that in time domain, and then outputs to the data to the stereo information extractor and the down-mixer.

The stereo information extractor may, for example, extract stereo information, based on the FFT spectrum of each channel. By way of example, the stereo information extractor may parameterize a stereo signal by using binaural cues, such as the ILD, the ICC and the ITD, and then output the resultant parameter to the down-mixer and the encoding unit. For example, the stereo information extractor may include ITD estimator 10 (e.g., corresponding to signal processing apparatus) that parameterizes an ITD. ITD estimator 10 estimates an inter-channel time difference (ITD), for example. An exemplary method of estimating an ITD in ITD estimator 10 will be described later.

The down-mixer may perform, for example, downmix processing based on the FFT spectrum of each channel outputted from the converter and the binaural cue parameter (e.g., including estimated ITD) outputted from the stereo information extractor, and may thereby generate a Mid signal (e.g., also referred to as an M-signal) and a Side signal (e.g., also referred to as a S-signal). For example, when the data with a manipulated FFT spectrum of the L-channel is defined as L', the down-mixer may perform the downmix where $M=(L'+R)/2$ and $S=(L'-R)/2$, and output the M-signal and the S-signal to the encoding unit. Here, M indicates the Mid signal, S indicates the Side signal, and R indicates a FFT spectrum of the R-channel.

The above processing of the down-mixer has been described with an example in which the FFT spectrum of the L-channel is manipulated with reference to the R-channel, but the processing is not limited to this example and the FFT spectrum of the R-channel may be manipulated with reference to the L-channel, for example.

The encoding unit performs, for example, encoding respectively on the M-signal and the S-signal outputted from the down-mixer and the binaural cue parameter (e.g., including estimated ITD) outputted from the stereo information extractor, and outputs the encoded data. Incidentally, the encoding unit may be provided with, for example, a variety of standardized speech acoustic codecs, such as Moving Picture Experts Group (MPEG), 3rd Generation Partnership Project (3GPP), or International Telecommunication Union Telecommunication Standardization Sector (ITU-T), without limitation to the codec described above.

The encoding apparatus transmits, to the decoding apparatus, the encoded data outputted from the encoding unit of the encoder, via communication network or a storage medium (not illustrated).

[Exemplary Configuration of Decoding Apparatus]

The decoding apparatus may include, for example, a decoder, a D/A converter (not illustrated), and an output device such as a speaker (not illustrated). The decoding apparatus, for example, receives encoded data via communication network or a storage medium (not illustrated) and inputs the received data to the decoder.

The decoder may include, for example, a decoding unit, an up-mixer, a stereo information combiner, and a converter (e.g., IFFT unit) that converts a signal in frequency domain into a signal in time domain (not illustrated).

For example, the encoded data inputted to the decoder is inputted to the decoding unit. The decoding unit decodes the inputted encoded data by using the codec used at the encoding apparatus side, and outputs the M- and S-signals and the binaural cue parameter to the up-mixer and the stereo information combiner, for example. The decoding unit may be provided with, for example, a variety of standardized speech acoustic codecs, such as MPEG, 3GPP, or ITU-T.

The up-mixer may perform, for example, up-mix processing, based on the M-signal and the S-signal outputted from the decoder. For example, the up-mixer performs the up-mix processing where $L'=M+S$ and $R=M-S$, and then outputs an L'-signal and an R-signal in the FFT spectrum to the stereo information combiner.

The stereo information combiner may perform, for example, processing in a reversed manner from the encoding apparatus (e.g., stereo information extractor) to output an L-signal in the FFT spectrum, by using the binaural cue parameter (including estimated ITD) outputted from the decoder and the L' signal in the FFT spectrum outputted from the up-mixer.

The converter converts, for example, the L-signal and the R-signal in the FFT spectrum into L-channel and R-channel digital signals in time domain, for the respective channels, and then outputs the digital signals as output signals for the decoder.

The D/A converter, for example, converts the digital signal outputted from the decoder into a speech acoustic signal (analog signal) and outputs the speech acoustic signal to the output device.

The output device outputs, from, for example, a speaker, the analog signal outputted from the D/A converter. Note that, in order to handle a stereo signal, in the decoding apparatus, at least one of the output device and the D/A converter may be provided in plurality (e.g., two).

[Exemplary Configuration of ITD Estimator]

Figure 2:
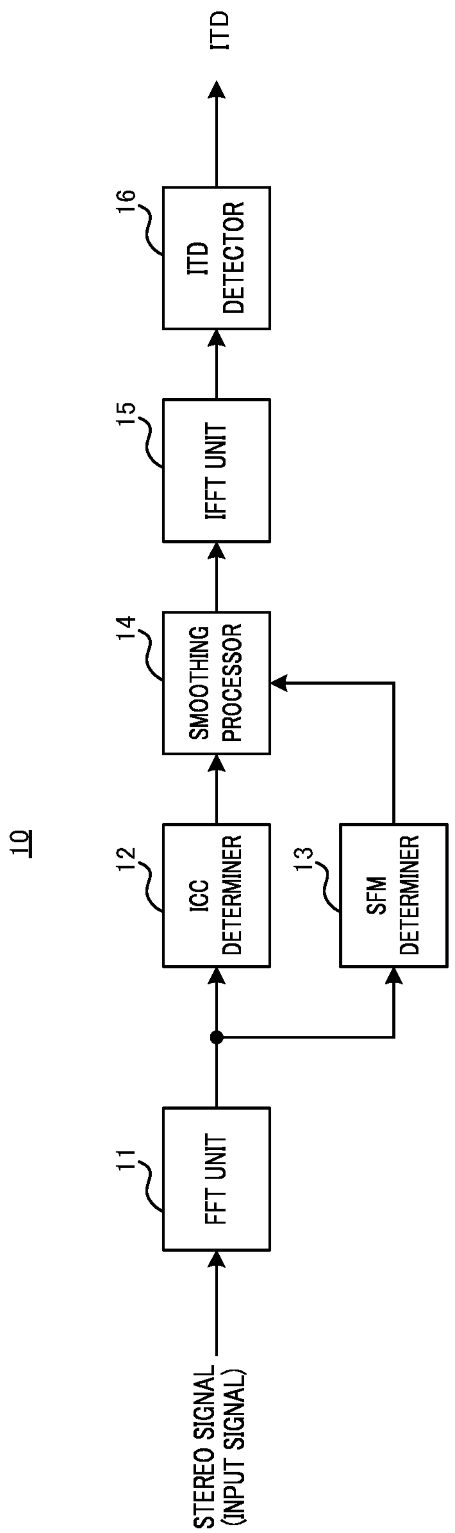
FIG. 2 is a block diagram illustrating an exemplary configuration of an inter-channel time difference (ITD) estimator.

Next, an exemplary configuration of ITD estimator 10 will be described. FIG. 2 is a block diagram illustrating an exemplary configuration of ITD estimator 10. Further, FIG. 3 is a flowchart describing an exemplary operation of ITD estimator 10 illustrated in FIG. 2.

ITD estimator 10 illustrated in FIG. 2 may include, for example, FFT unit 11, ICC determiner 12, SFM determiner 13, smoothing processor 14, IFFT unit 15, and ITD detector 16.

For example, a stereo signal in time domain (e.g., L channel and R channel) may be inputted into FFT unit 11 independently for each channel. FFT unit 11, for example, converts each of the channel signals in time domain into a frequency-domain signal (hereinafter referred to as an FFT spectrum) (e.g., S11 of FIG. 3). FFT unit 11 outputs information on the FFT spectrum to ICC determiner 12 and SFM determiner 13. A method of converting from the time-domain signal to the frequency-domain signal is not limited to FFT and may be other methods.

Figure 3:
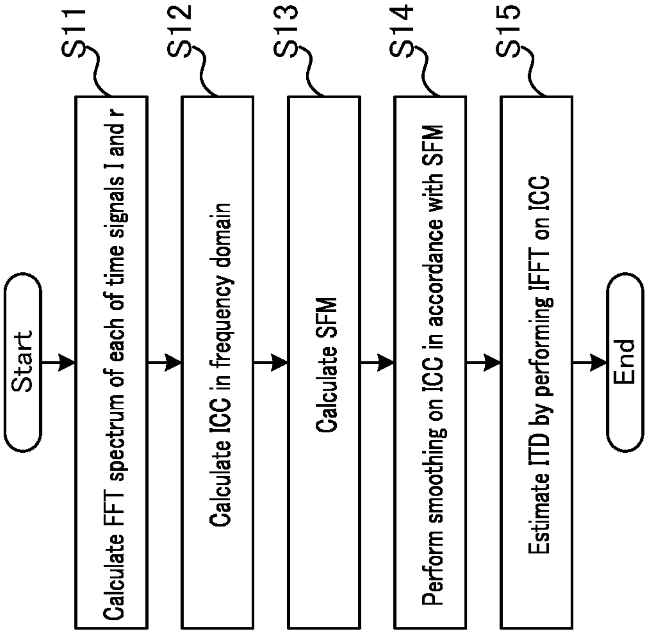
FIG. 3 is a flowchart describing an example of ITD estimation processing.

ICC determiner 12 determines (e.g., calculates) an inter-channel cross correlation (ICC), based on the FFT spectrum of each channel outputted from FFT unit 11 (S12 of FIG. 3). ICC determiner 12 outputs information on the determined ICC to smoothing processor 14.

SFM determiner 13 determines (e.g., calculates) a degree of spectral flatness (SFM), based on the FFT spectrum of each channel outputted from FFT unit 11 (S13 of FIG. 3). SFM determiner 13 outputs information on the determined SFM to smoothing processor 14.

Smoothing processor 14 performs, for example, smoothing processing between frames for the ICC outputted from ICC determiner 12, by configuring the SFM outputted from SFM determiner 13 as a smoothing coefficient (e.g., S14 of FIG. 3). For example, the lower the SFM (or smoothing coefficient) is, the stronger the smoothing degree (or strength) may be. Smoothing processor 14 outputs, to IFFT unit 15, information on the ICC after the smoothing processing.

IFFT unit 15 converts the smoothed ICC in smoothing processor 14 into a signal in time domain from that in frequency domain, for example. IFFT unit 15 outputs information on the ICC in time domain to ITD detector 16. A method of converting from the frequency-domain signal to the time-domain signal is not limited to IFFT and may be other methods.

ITD detector 16 (e.g., corresponding to estimation circuitry) detects (or estimates), for example, an ITD based on the ICC in time domain output from IFFT unit 15 (e.g., S15 of FIG. 3).

In ITD estimator 10 illustrated in FIG. 2, for example, the stronger the tonality of a stereo signal is (e.g., the lower the SFM is), the stronger the degree of smoothing is; hence, estimation accuracy of the ITD when a sound source moves may be reduced as described above. Hereinafter, by way of example, a description will be given of a method to improve the estimation accuracy of the ITD even when a single sound source moves.

Figure 4:
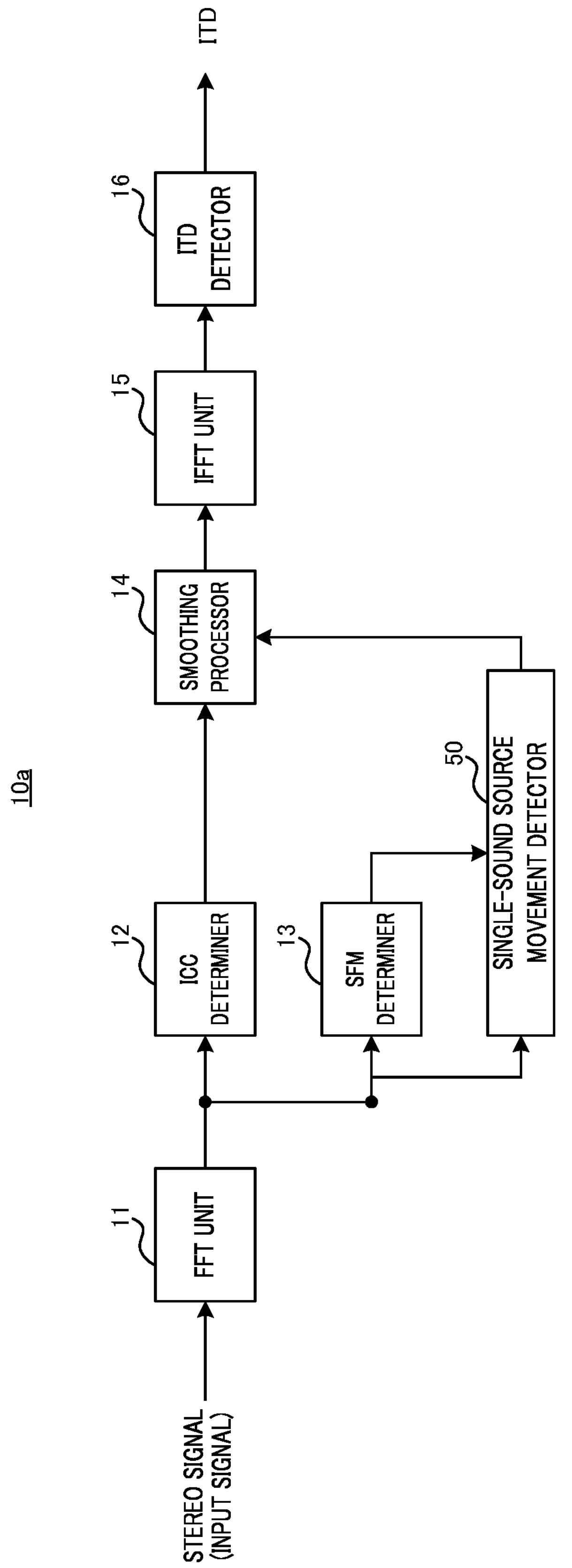
FIG. 4 is a block diagram illustrating an exemplary configuration of another ITD estimator.

FIG. 4 is a block diagram illustrating an exemplary configuration of ITD estimator 10*a* according to the present embodiment.

ITD estimator 10*a* illustrated in FIG. 4 is additionally provided with, for example, single-sound source movement detector 50, as compared to the configuration of ITD estimator 10 illustrated in FIG. 2. In ITD estimator 10*a* illustrated in FIG. 4, the configurations of components other than single sound source movement detector 50 may be similar to those in FIG. 2, for example.

Single sound source movement detector 50 (e.g., corresponding to detection circuitry and control circuitry) may, for example, have a function to detect movement of a single sound source of a stereo signal (i.e., time change of ITD of stereo signal), based on the FFT spectrum of each channel outputted from FFT unit 11, and a function to control the smoothing in smoothing processor 14 (e.g., control on the degree of ICC smoothing).

Single sound source movement detector 50 may detect, for example, the movement of the single-sound source, e.g., the time change of the ITD of the stereo signal, and control the smoothing based on a detection result of the single-sound source movement.

Figure 5:
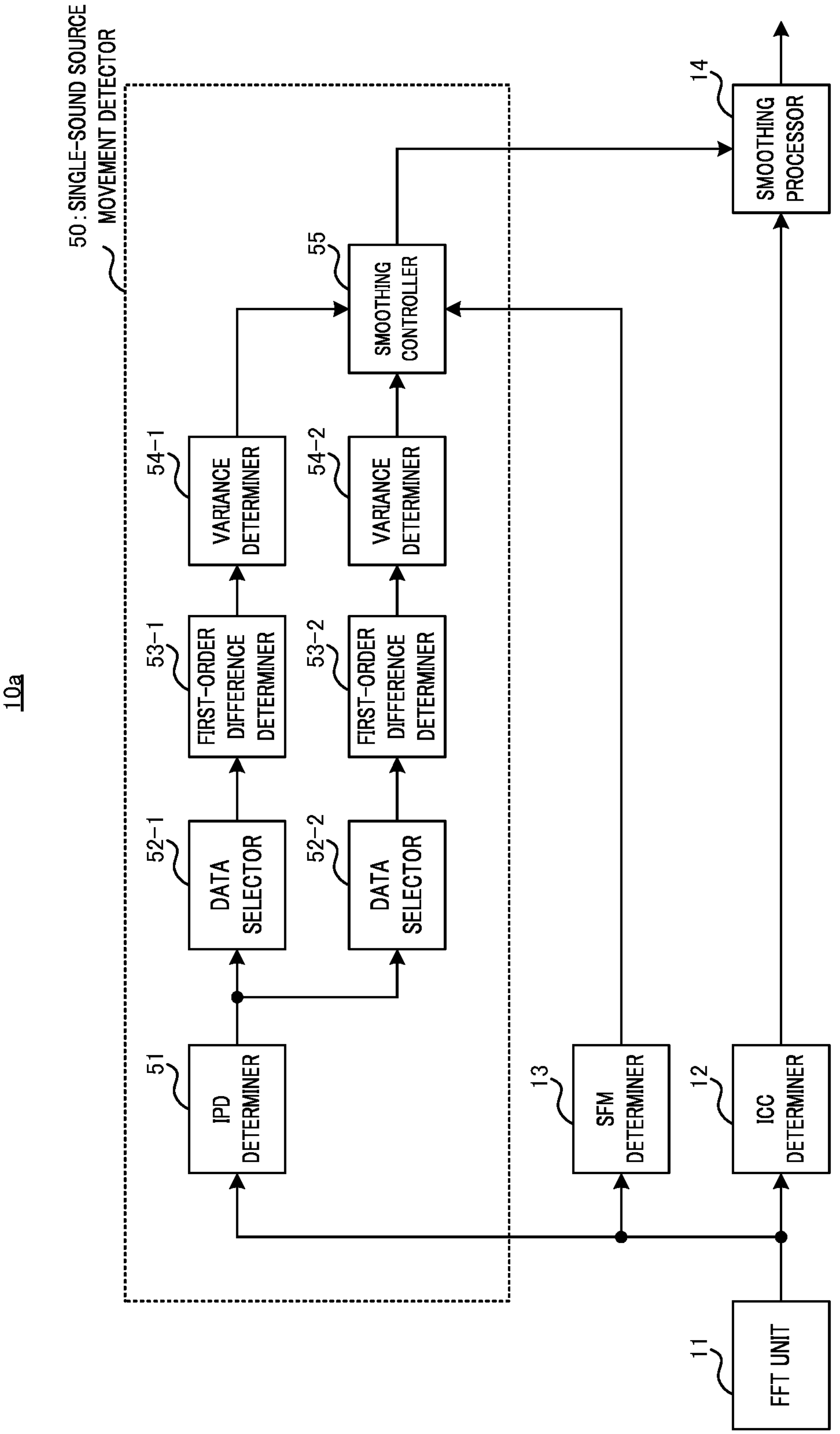
FIG. 5 illustrates an exemplary configuration of a single-sound source movement detector.

FIG. 5 is a block diagram illustrating an exemplary configuration of single sound source movement detector 50.

Single sound source movement detector 50 illustrated in FIG. 5 may include, for example, IPD determiner 51, data selector 52-1, data selector 52-2, first-order difference determiners 53-1 and 53-2, variance determiners 54-1 and 54-2, and smoothing controller 55.

IPD determiner 51 determines (e.g., calculates), for example, an inter-channel phase difference (referred to as IPD or IPD spectrum), based on the FFT spectrum (e.g., FFT phase spectrum) of each of the L-channel and the R-channel outputted from FFT unit 11. IPD determiner 51 may, for example, determine an IPD spectrum for each frequency bin. IPD determiner 51 outputs information on the IPD to data selector 52-1 and data selector 52-2.

Here, the IPD may be defined as, for example, a difference between phase spectra of two channels of a stereo signal. For example, in a case where a single-sound source moves in such a manner that the inter-channel time difference (ITD) varies about one sample/frame (e.g., increasing or decreasing by 0.03125 ms per frame in case of 32-kHz sampling and 20-ms one frame), a linear shape (e.g., including saw shape) tends to appear in a low-frequency band and not to appear in a high-frequency band, in the IPD spectrum. In other words, in the IPD spectrum, a sound source for which the linear shape appears in the low-frequency band and does not appear in the high-frequency band is likely to be moving singly.

Figure 6:
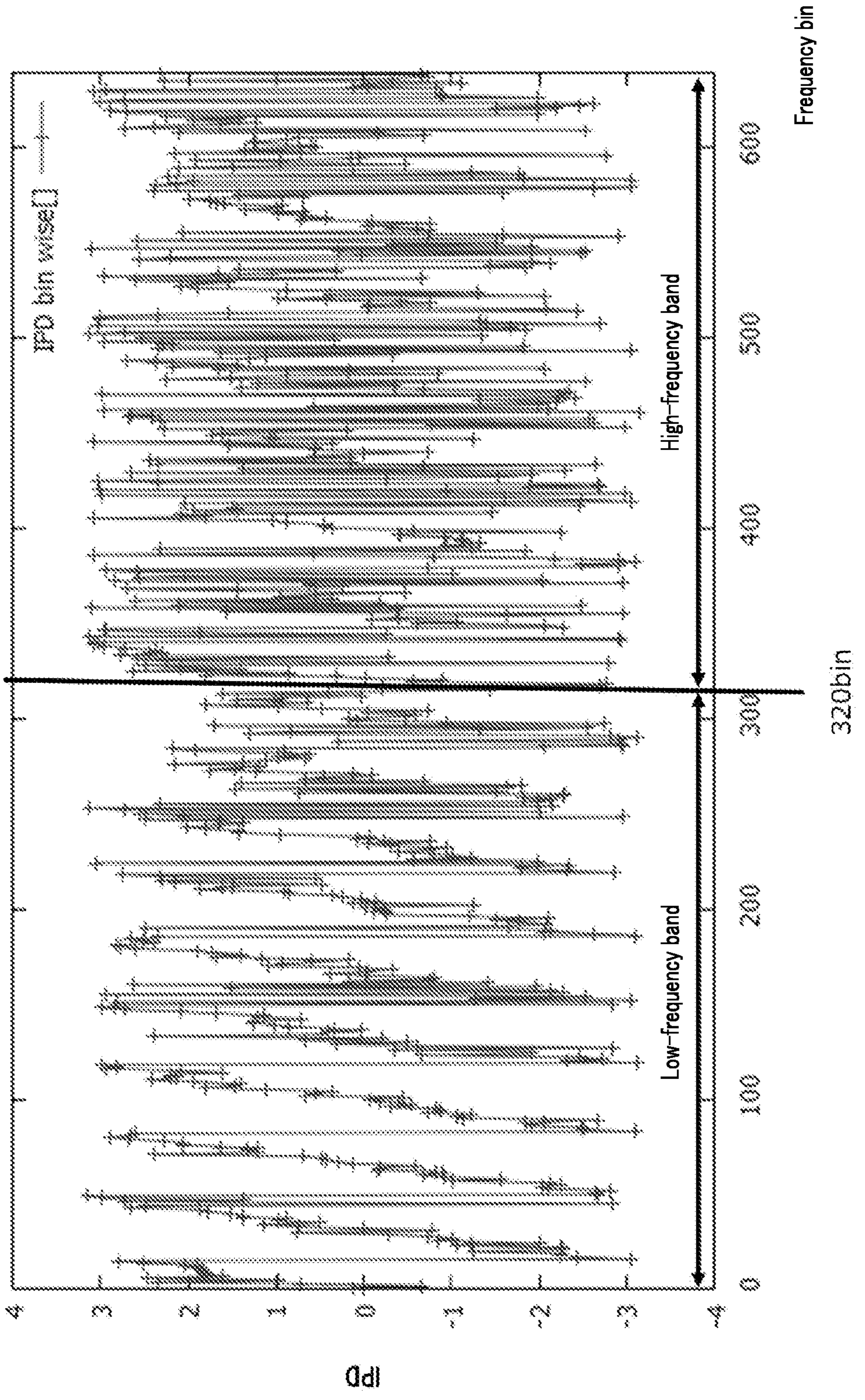
FIG. 6 illustrates an exemplary inter-channel phase difference (IPD) spectrum.

FIG. 6 illustrates an exemplary IPD spectrum. In FIG. 6, the vertical axis indicates a phase of the IPD spectrum, and the horizontal axis indicates a frequency bin of the IPD spectrum.

Note that the IPD spectrum illustrated in FIG. 6 is normalized into a range of $-\pi$ to $+\pi$ and is wrapped around (or aliased) within a range of $-\pi$ to $+\pi$, for example. Here, for example, as the higher frequency band range is, the larger the IPD (e.g., inclination of IPD in FIG. 6) tends to be. Further, for example, when a sound source is moving (e.g., when ITD is changing in time), a value of the IPD is likely to fluctuate. For this reason, as illustrated in FIG. 6, in the low-frequency band of the IPD spectrum, components with distinct linear shapes (e.g., sawtooth shapes) are likely to appear, and in the high-frequency band of the IPD spectrum, the aforementioned wrap-arounds are likely to occur highly frequently and noise components are thus likely to appear. In other words, for example, as illustrated in FIG. 6, a distinct linear shape is likely to appear in the low-frequency band of the IPD spectrum and is less likely to appear in the high-frequency band of the IPD spectrum (or linear shape partly appears).

From the above, single sound source movement detector 50, for example, may detect the movement of the single sound source, i.e., the time change of the ITD, based on the shape of the IPD spectrum in each of the low-frequency band and the high-frequency band. For example, single sound source movement detector 50 may detect (or specify) whether linear shapes (e.g., spectral shapes illustrated in FIG. 6) appear in the phase spectrum for each of the low-frequency band and the high-frequency band, and may thereby determine whether it is a case where the single sound source is moving (e.g., case where single sound source moves slowly).

For example, single sound source movement detector 50 may detect the movement of the single sound source (e.g., time change of ITD), based on a variance of the IPD for the low-frequency band of the stereo signal (e.g., first-order difference of IPD spectrum) and a variance of the IPD for the high-frequency band of the stereo signal (e.g., first-order difference of IPD spectrum).

In FIG. 5, for example, data selector 52-1, first-order difference determiner 53-1, and variance determiner 54-1 are components that perform processing for the IPD spectrum (or IPD data) in the low-frequency band, whereas data selector 52-2, first-order difference determiner 53-2, and variance determiner 54-2 are components that perform processing for the IPD spectrum (or IPD data) in the high-frequency band.

Data selector 52-1 selects, for example, data to be outputted to first-order difference determiner 53-1 on a subsequent stage, from IPD data in the low-frequency band of the signal outputted from IPD determiner 51. For example, single sound source movement detector 50 may not use, for detecting movement of the single sound source (or time change of ITD), information on the IPDs respectively corresponding to +π and +π when IPD data (phase) is normalized into a range of −η to +π. By way of example, data selector 52-1 may select IPD data within a range of −0.75 π and +0.75 π. In other words, as illustrated in FIG. 6, data selector 52-1 may remove IPD data corresponding to a wrapped-around (aliasing) portion of the IPD spectrum from the IPD data used for the detection of the movement of the single sound source. Data selector 52-1 outputs the selected data to first-order difference determiner 53-1.

First-order difference determiner 53-1 determines (e.g., calculates), for example, a first-order difference of the selected IPD data in the low-frequency band by data selector 52-1 (e.g., difference between IPD data of adjacent frequency bins), and then outputs information on the first-order difference to variance determiner 54-1. A difference to be determined (or detected) by first-order difference determiner 53-1 is not limited to the first-order difference. For example, an inclination between IPD data may be detected by differentiation of the IPD data. The same applies to first-order difference determiner 53-2 described later.

Variance determiner 54-1 determines (e.g., calculates), for example, a variance of the first-order difference in the low-frequency band outputted from first-order difference determiner 53-1, and then outputs, to smoothing controller 55, information on the variance of the first-order difference in the low-frequency band.

As with data selector 52-1, data selector 52-2 selects, for example, data to be outputted to first-order difference determiner 53-2 on a subsequent stage from IPD data in the high-frequency band of the signal outputted from IPD determiner 51. Data selector 52-2 outputs the selected data to first-order difference determiner 53-2.

As with first-order difference determiner 53-1, first-order difference determiner 53-2 determines (e.g., calculates), for example, a first-order difference of the selected IPD data in the high-frequency band by data selector 52-2 and then outputs information on the first-order difference to variance determiner 54-2.

As with variance determiner 54-1, variance determiner 54-2 determines (e.g., calculates), for example, a variance of the first-order difference in the high-frequency band outputted from first-order difference determiner 53-2, and then outputs, to smoothing controller 55, information on the variance of the first-order difference in the high-frequency band.

Here, variance determiner 54-1 and variance determiner 54-2 may, for example, skip IPD data outputted from data selector 52-1 and data selector 52-2. In one example, IPD [k] (k indicates a number assigned to IPD in the output order from data selector 52-1 and data selector 52-2), every second IPD may be skipped in such a manner that k=1, 3, 5, and so forth till 2m−1 or k=2, 4, 6, and so forth till 2m, or every third IPD may be skipped. Variance determiner 54-1 and variance determiner 54-2 may determine a variance based on the IPD data after the skipping, for example. Skipping IPD data reduces a computation amount in variance determiner 54-1 and variance determiner 54-2. Note that a skipping method for IPD data is not limited to skipping every second IPD or every third IPD described above and may be other methods. Also, for example, variance determiner 54-1 and variance determiner 54-2 may calculate a variance in a specified band (e.g., 100 Hz width or 200 Hz width) in the vicinity of a center of at least one of the low-frequency band and the high-frequency band.

Smoothing controller 55 determines (e.g., calculates), for example, a smoothing coefficient based on the variance of the first-order difference in the low-frequency band outputted from variance determiner 54-1, the variance of the first-order difference in the high-frequency band outputted from variance determiner 54-2, and the SFM outputted from SFM determiner 13. Smoothing controller 55 outputs information on the determined smoothing coefficient to smoothing processor 14.

For example, in PTL 1, an SFM is configured as the smoothing coefficient (e.g., referred to as "alpha"). In the present embodiment, for example, the smoothing coefficient, alpha, may be calculated based on the following Equation 1:

$$\text{Alpha}=\text{Max}(SFM, 1-VL/VH) \quad \text{(Equation 1).}$$

Here, function Max (A, B) is a function for outputting the larger value between A and B. Further, VL represents a variance in the low-frequency band determined by variance determiner 54-1, and VH represents a variance in the high-frequency band determined by variance determiner 54-2.

For example, as illustrated in FIG. 6, in the case of a sound source for which a linear shape appears in the lower frequency band and no linear shape appears in the high-frequency band (e.g., sound source moving singly), the variance, VL, in the low-frequency band tends to be low, whereas the variance, VH, in the high-frequency band tends to be high. In this case, in Equation 1, the value of 1-VL/VH tends to be high (e.g., becomes a value closer to one), the value of alpha tends to be a value close to one.

Here, a case where alpha=1 corresponds to a case of not applying the smoothing processing. Thus, smoothing controller 55, for example, weakens a degree (or strength) of smoothing when the single-sound source movement (e.g., shape of IPD spectrum as illustrated in FIG. 6) is detected to less than a degree of smoothing when no single-sound source movement is detected.

Hence, when the sound source moves singly, for example, the smoothing processing in smoothing processor 14 is weakened, i.e., the effect of ICC of a past frame is reduced. Accordingly, ITD detector 16 can estimate an ITD which reflects an instantaneous change of ICC caused by the single-sound source movement. Therefore, ITD estimator 10*a* can improve the estimation accuracy of an ITD even when the single-sound source moves.

Alternatively, smoothing controller 55 may determine the smoothing coefficient, alpha, based on comparison between a variance of a first-order difference of an IPD spectrum and a threshold, for example. In other words, smoothing controller 55 may detect the single-sound source movement based on the comparison between the variance of the first-order difference of the IPD spectrum and the threshold, and may determine the smoothing coefficient, alpha, based on a detection result of the single-sound source movement, for example.

By way of example, smoothing controller 55 may determine that a sound source of a stereo signal is moving singly (or ITD is changing with time) when the variance, VL, in the low-frequency band and the variance, VH, in the high-frequency band satisfy a predetermined condition, and may thus perform weakening a degree of smoothing to less than a degree of smoothing when the condition is not satisfied. Note that the weakening of the degree of smoothing may include, for example, not executing the smoothing.

For example, smoothing controller 55 may configure the smoothing coefficient, alpha=1, when conditions of $VL<Th1$ and $VH/VL>Th2$ are satisfied in a specified section (e.g., five contiguous frames), and may configure the smoothing coefficient, alpha=SFM, when the conditions of $VL<Th1$ and $VH/VL>Th2$ are not satisfied in the specified section.

Here, for example, in the case of the IPD spectrum shape illustrated in FIG. 6, the variance, VL, of the first-order difference of the IPD spectrum (e.g., linear shape) in the low-frequency band tends to be small, and the variance, VH, of the first-order difference of the IPD spectrum in the high-frequency band tends to be large. Hence, conditions that the variance, VL, is smaller than the threshold, Th1, (e.g., $VL<Th1$) while a ratio of the variance, VH, to the variance, VL, is larger than the threshold, Th2, ($VH/VL>Th2$) are easily satisfied. Accordingly, in the specified section, when the conditions of $VL<Th1$ and $VH/VL>Th2$ are satisfied, smoothing controller 55 may determine that the single-sound source movement has been detected and may determine the smoothing coefficient, alpha=1, i.e., that the smoothing is not executed. This makes it possible for ITD estimator 10*a* to improve the estimation accuracy of an ITD even when a single-sound source moves.

On the other hand, in the specified section, when the conditions of $VL<Th1$ and $VH/VL>Th2$ are not satisfied, smoothing controller 55 may determine that the single-sound source movement has not been detected and may determine to perform the smoothing with the smoothing coefficient, alpha=SFM. Meanwhile, when one of the conditions of $VL<Th1$ and $VH/VL>Th2$ is not satisfied in the specified section (e.g., five contiguous frames) after alpha is once configured as alpha=1, for example, smoothing controller 55 may determine that the single-sound source movement has been completed and may configure (or re-configure, switch) alpha as (to) alpha=SFM. Thus, for example, when a sound source does not move, ITD estimator 10*a* can improve the estimation accuracy of an ITD by performing smoothing on an ICC with respect to a signal with strong tonality.

Among the above-described conditions, $VL/VH<Th3$ (e.g., $Th3=1/Th2$) may be applied instead of $VH/VL>Th2$. Here, Th1 and Th2 are thresholds, and Th1 may be set to 2.25 and Th2 may be set to 1.50, for example. The configuration values for Th1 and Th2 are not limited to these and may be other values.

Further, here, a case has been described as an example where 1 frame=20 ms is assumed and a specified section is 5 frames (e.g., 100 ms). In this case, switching the smoothing coefficient, alpha, in the above-described determination processing by using the thresholds can be performed for every 100 ms at the shortest period. This allows smoothing controller 55 to determine the single-sound source movement based on the IPD spectrum shape over the specified section. Thus, it is made possible to suppress occurrence of erroneous switching of the smoothing processing (e.g., smoothing coefficient, alpha) even in a case where erroneous determination for detection of movement of a single-sound source may be made, such as a case where movement of a sound source is detected by an increase in VH due to a wrap-around in some frames within the specified section when a single-sound source with a certain phase difference and strong periodicity is not moving. A specified section is not limited to 100 ms (or 5 frames) and may be other values. For example, the specified section may be determined depending on a switching period for modes in a stereo encoding system.

Smoothing processor 14 may use the smoothing coefficient, alpha, outputted from single sound source movement detector 50 to perform the smoothing processing on the ICC outputted from ICC determiner 12. For example, the smoothing processing may be executed based on the following Equation 2:

$$ICCsmooth(t)[n]=(1-alpha)*ICCsmooth(t-1)[n]+alpha*ICC[n] \qquad \text{(Equation 2).}$$

Here, ICCsmooth(t)[n] represents the n-th element of the ICC to be smoothed at time t (or the t-th frame), alpha represents a smoothing coefficient determined by smoothing controller 55, and ICC[n] represents the n-th element of the ICC at the present time (or present frame).

Then, ITD detector 16 may estimate an ITD based on the ICC for which the degree of smoothing is controlled, for example.

Figure 7:
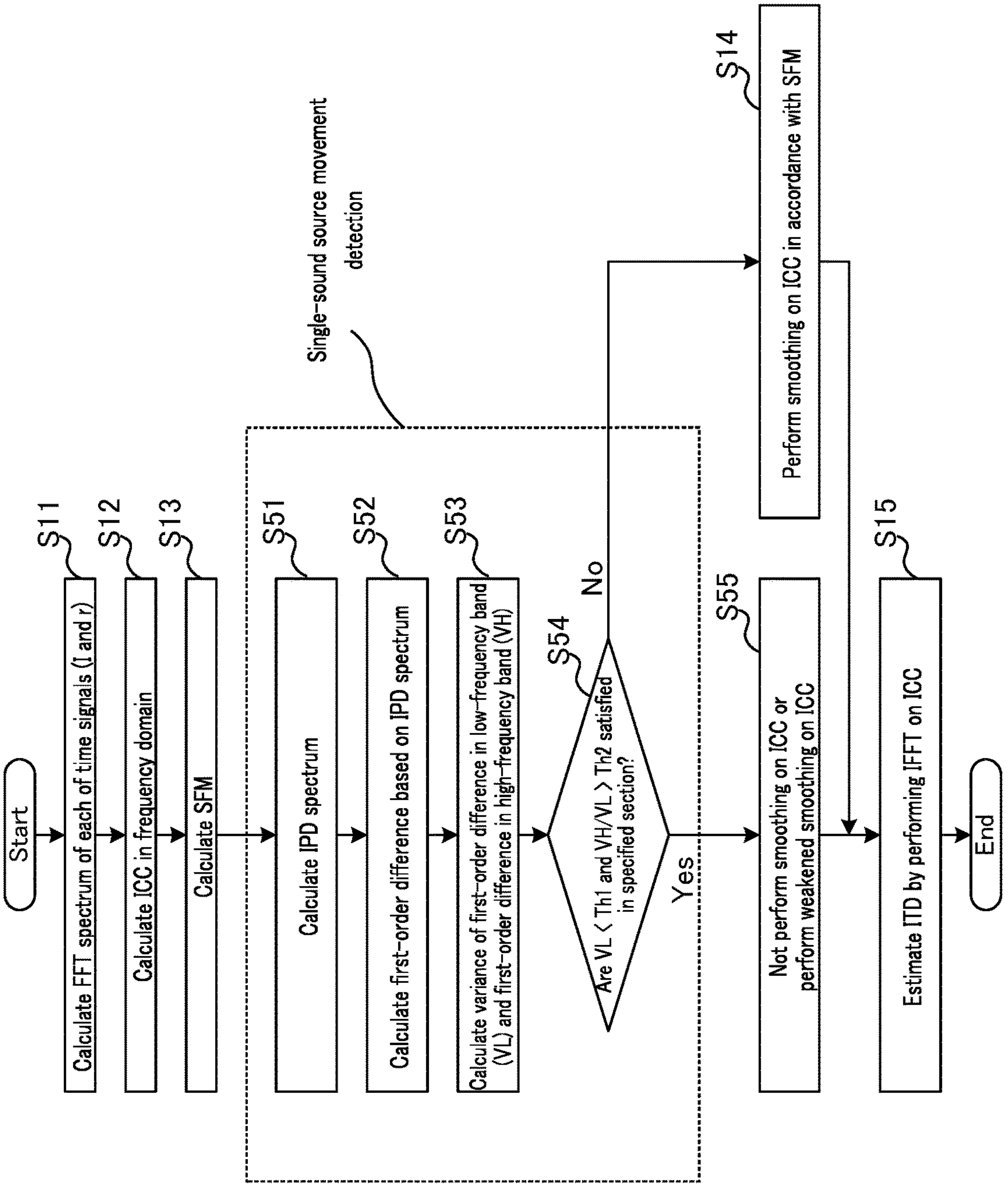
FIG. 7 is a flowchart describing another example of ITD estimation processing.

FIG. 7 is a flowchart illustrating an exemplary operation for the ITD estimation processing according to the present embodiment. Note that the processes of S11 to S15 illustrated in FIG. 7 are the same as the processes of S11 to S15 illustrated in FIG. 3.

In FIG. 7, ITD estimator 10*a* calculates an IPD spectrum based on the FFT spectrum of each of an L-channel and an R-channel of a stereo signal, for example (S51).

ITD estimator 10*a* calculates a first-order difference based on the IPD spectrum, for example (S52). Additionally, ITD estimator 10*a* calculates, for example, a variance (e.g., VL) of a first-order difference in the low-frequency band and a variance (e.g., VH) of a first-order difference in the high-frequency band, based on the first-order difference of the IPD spectrum (S53).

ITD estimator 10*a* determines whether the conditions of $VL<Th1$ and $VH/VL>Th2$ are satisfied in a specified section (e.g., five contiguous frames), for example (S54).

When the conditions are satisfied (S54: Yes), ITD estimator 10*a* does not perform the smoothing on an ICC (e.g., alpha=1 is configured) or performs weakened smoothing on the ICC (e.g., configuration of alpha based on Equation 1) (S55). On the other hand, when the conditions are not satisfied (S54: No), that is, for example, when a single-sound source is unlikely to move, ITD estimator 10*a* performs the smoothing on the ICC based on the SFM (S14).

Thus, according to the present embodiment, ITD estimator 10*a* includes single sound source movement detector 50 and detects movement of a single-sound source of a stereo signal (time change of ITD). ITD estimator 10*a* controls, for example, smoothing in a plurality of frames (sections) of an ICC, based on information on the movement of the single-sound source of the stereo signal (e.g., detection result).

Thus, ITD estimator 10*a* can improve the robustness for the time change of the ITD when the single-sound source moves, for example. In other words, ITD estimator 10*a* can improve, for example, the tracking accuracy for a moving sound source (e.g., temporal followability of ITD). Therefore, according to the present embodiment, even when a single-sound source of a stereo signal moves, the ITD estimation accuracy can be improved and the encoding performance can be thus improved.

Embodiment 2

In ITD estimator 10*a* according to the present embodiment, for example, the configuration of single sound source movement detector 60 is different from that in Embodiment 1, and the other configurations may be similar to those in Embodiment 1.

Figure 8:
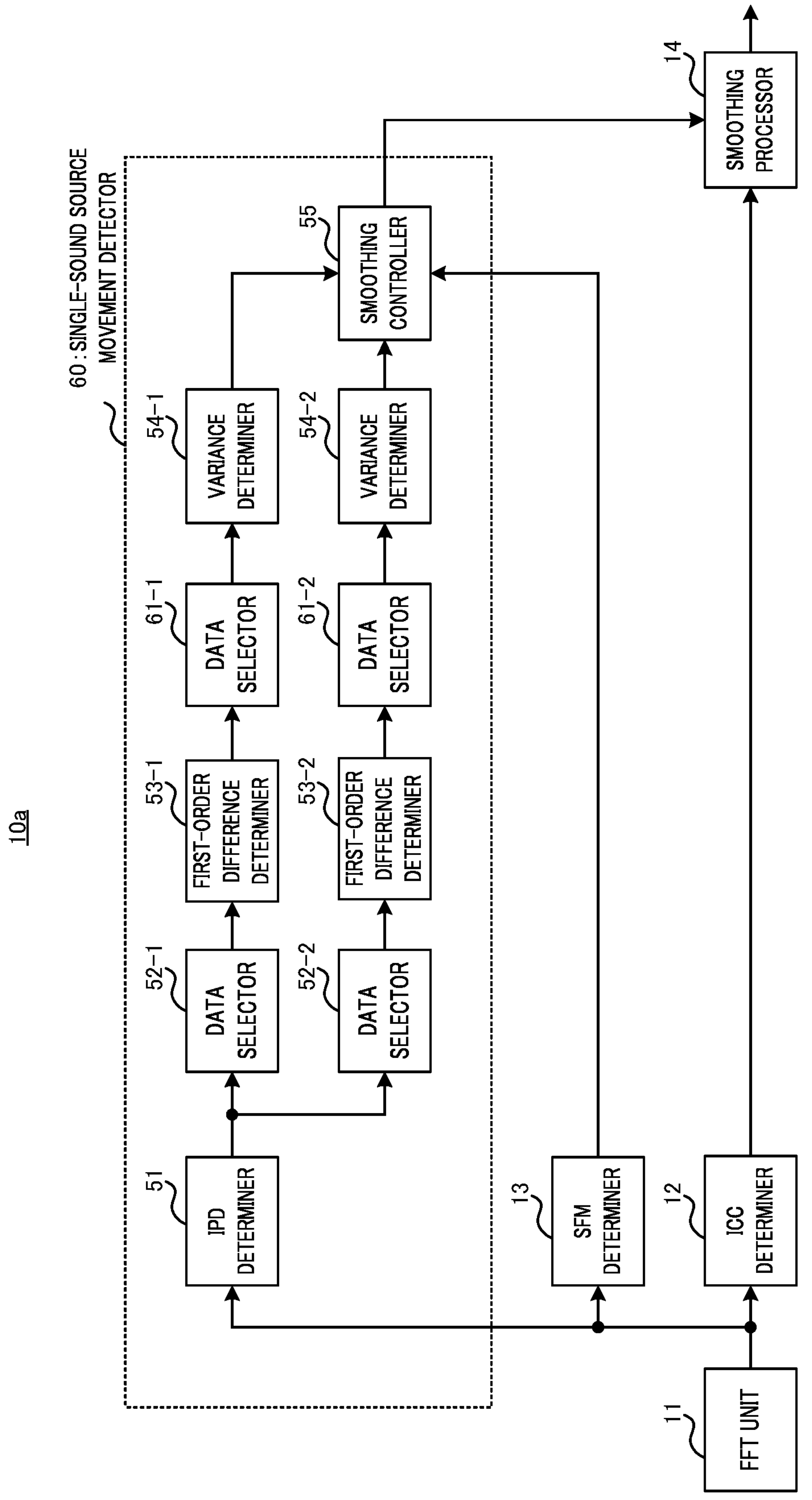
FIG. 8 is a block diagram illustrating an exemplary configuration of another ITD estimator.

FIG. 8 is a block diagram illustrating an exemplary configuration of single-sound source movement detector 60 according to the present embodiment. Single sound source movement detector 60 illustrated in FIG. 8 includes data selector 61-1 and data selector 61-2, in addition to the configuration similar to single sound source movement detector 50.

Data selector 61-1 may be provided between first-order difference determiner 53-1 and variance determiner 54-1, for example. Data selector 61-1 may select data by, for example, removing an outlier from a first-order difference in a low-frequency band.

Removal of the outlier can be achieved by, for example, configuring the upper- and lower-limit values (i.e., configuring boundaries) of the data selected by data selector 61-1 (e.g., first-order difference of IPD spectrum). For example, the upper-limit value of the data may be configured as Dmean+$\pi/2$, and the lower-limit value of the data may be configured as Dmean−$\pi/2$. Here, Dmean represents the mean value of the first-order differences.

As with data selector 61-1, data selector 61-2 may be provided between first-order difference determiner 53-2 and variance determiner 54-2, for example. Data selector 61-2 may select, for example, data by removing an outlier from a first-order difference in a high-frequency band.

Thus, single sound source movement detector 60 selects, for example, first-order difference data used for detection of movement of a single-sound source (e.g., time change of ITD), based on the mean value, Dmean, of the first-order differences of an IPD spectrum (e.g., range from $-0.75\pi$ to $+0.75\pi$ in aforementioned example).

This data selection (or removal of outlier) enables, for example, improvement in the accuracy of the first-order difference of the IPD spectrum (e.g., IPD inclination component in frequency domain); accordingly, in ITD estimator 10*a*, it is possible to improve the determination accuracy of a shape of an IPD spectrum when a single-sound source moves (e.g., detection accuracy of movement of single-sound source). Thus, according to the present embodiment, for example, as compared with Embodiment 1, the estimation accuracy of an ITD can be improved, and the encoding performance can be thus improved.

In the present embodiment, single sound source movement detector 60 may, for example, switch whether to apply the data selection for the first-order difference in data selector 61-1 and data selector 61-2.

The embodiments of the present disclosure have been each described, thus far.

[Variation of Smoothing Control]

For example, the smoothing control may be performed based on the SFM (or information on tonality).

Figure 9:
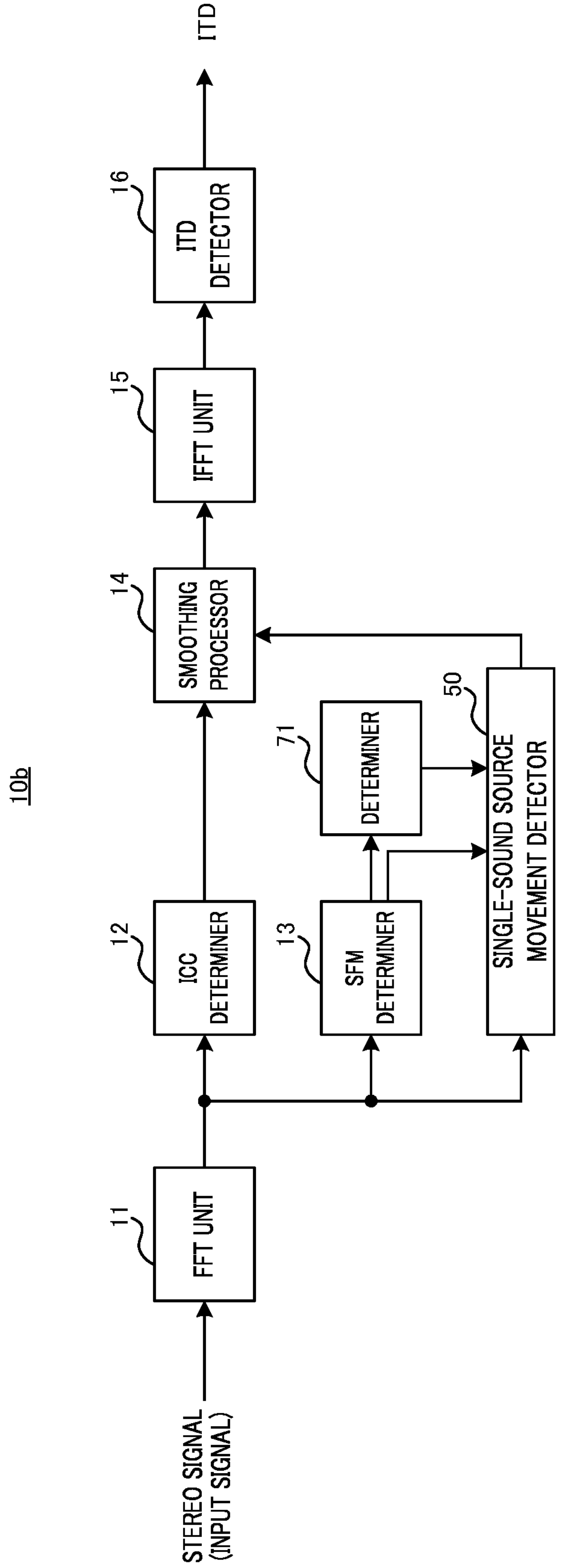
FIG. 9 is a block diagram illustrating an exemplary configuration of still another ITD estimator.

FIG. 9 is a block diagram illustrating an exemplary configuration of ITD estimator 10*b* according to the variation. ITD estimator 10*b* illustrated in FIG. 9 may include determiner 71, in addition to the configuration of ITD estimator 10*a* according to Embodiment 1, for example. Incidentally, ITD estimator 10*b* may include single sound source movement detector 50 of Embodiment 1 or may include single sound source movement detector 60 of Embodiment 2.

In FIG. 9, determiner 71 may determine, for example, whether to perform the smoothing control by single sound source movement detector 50 (e.g., determination of smoothing coefficient, alpha), based on information on an SFM inputted from SFM determiner 13.

Here, the weaker the tonality of a stereo signal is, the higher the SFM tends to be, and an ICC is less likely to be smoothed by the SFM. Therefore, in a case where the SFM is high as in a stereo signal with the weak tonality (e.g., when SFM is equal to or larger than threshold), improvement effect on the ITD estimation accuracy, which is brought by smoothing control by single sound source movement detector 50, may be low, as compared with a case where the SFM is low as in a stereo signal with the strong tonality (e.g., when SFM is less than threshold).

Hence, determiner 71 may determine not to execute the smoothing control by single sound source movement detector 50 in a case where the SFM is equal to or larger than the threshold, for example. In this case, single sound source movement detector 50 may configure the SFM outputted from SFM determiner 13 as the smoothing coefficient (e.g., alpha=SMF), for example.

On the other hand, determiner 71 may determine to perform the smoothing control by single sound source movement detector 50 in a case where the SFM is less than the threshold, for example. In this case, single sound source movement detector 50 may perform, for example, the smoothing control on an ICC (e.g., determination of smoothing coefficient, alpha), based on detection of the single-sound source movement, as in Embodiment 1.

Thus, the smoothing control on the basis of the SFM enables, for example, switching whether to apply the smoothing control based on the detection of the single-sound source movement (i.e., whether to bypass smoothing control), in accordance with the tonality of a stereo signal. Consequently, for example, improving the simplicity or efficiency of the smoothing control is possible.

[Configuration of Low-Frequency Band and High-Frequency Band]

For example, when a single-sound source is moving, a wrap-around of an IPD spectrum (phase) tends to frequently occur at a high frequency.

For example, as configuration of a low-frequency band and a high-frequency band in detection of single-sound source movement, a frequency that is low compared with the frequency at which the wrap-around easily occurs may be selected for both of the low-frequency band and the high-frequency band.

For example, 0 to 8 kHz may be configured as the low-frequency band, and 8 kHz to 16 kHz may be configured as the high-frequency band. Further, as other configuration examples for the low-frequency band and the high-frequency band, 0 to 2 kHz and 2 kHz to 4 kHz, 0 to 3 kHz and 3 kHz to 6 kHz, or 0 to 4 kHz and 4 kHz to 8 kHz may be possible.

The configuration of the low-frequency band and high-frequency band is not limited to these examples and may be other configuration values.

Further, for example, for the low-frequency band and the high-frequency band, frequency bands apart from each other may be configured, or frequency bands that partly overlap may be configured, and bandwidths thereof may be different from each other.

Meanwhile, for example, configuration relating to a frequency band of at least one of the low-frequency band and the high-frequency band (e.g., at least one of frequency position and bandwidth) may be variable. By way of example, the configuration of the frequency band may be determined (or changed) based on an analysis result such as the type of stereo signal (e.g., speech signal or acoustic signal), the position of sound source, or the dominant frequency band in the signal. Alternatively, for example, the configuration of frequency band may be determined based on the mean value of first-order differences of an IPD spectrum.

The configuration examples of the low-frequency band and the high-frequency band have been each described, thus far.

Further, in each embodiment described above, a case has been described where ITD estimator 10*a* detects movement of a single-sound source of a stereo signal, based on an inter-channel phase difference (IPD), but a method of detecting the movement of the single-sound source of the stereo signal is not limited to this, and the movement of the single-sound source may be detected with other methods.

Although various embodiments have been described above with reference to the drawings, it goes without saying that the present disclosure is not limited to foregoing embodiments. Further, any components in the embodiments described above may be combined as appropriate.

In the embodiments described above, " . . . er (or)" used for each component may be replaced with another term such as " . . . circuit (circuitry)," " . . . device," " . . . unit" and " . . . module."

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration.

The technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. Further, if future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. The communication apparatus may comprise a transceiver and processing/control circuitry. The transceiver may comprise and/or function as a receiver and a transmitter. The transceiver, as the transmitter and receiver, may include an RF (radio frequency) module including amplifiers, RF modulators/demodulators and the like, and one or more antennas. Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)."

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

A signal processing apparatus according to an embodiment of the present disclosure includes: detection circuitry, which, in operation, detects a time change of an inter-channel time difference of a stereo signal; and control circuitry, which, in operation, controls a degree of smoothing of an inter-channel cross correlation, based on the time change of the inter-channel time difference.

In an exemplary embodiment of the present disclosure, estimation circuitry, which, in operation, estimates the inter-channel time difference, based on the inter-channel cross correlation for which the degree of smoothing is controlled is further included.

In an exemplary embodiment of the present disclosure, the detection circuitry detects the time change of the inter-channel time difference, based on a first variance of an inter-channel phase difference for a first band of the stereo signal and a second variance of an inter-channel phase difference for a second band of the stereo signal.

In an exemplary embodiment of the present disclosure, the control circuitry determines that a sound source of the stereo signal is moving singly when the first variance and the second variance satisfy a predetermined condition, and performs weakening the degree of smoothing to less than the degree of smoothing when the condition is not satisfied.

In an exemplary embodiment of the present disclosure, the weakening of the degree of smoothing includes not executing the smoothing.

In an exemplary embodiment of the present disclosure, the second band is a band that is higher than the first band, and the condition is that the first variance is smaller than a first threshold while a ratio of the second variance to the first variance is larger than a second threshold.

In an exemplary embodiment of the present disclosure, the detection circuitry does not use, for detecting the time change of the inter-channel time difference, information on inter-channel phase differences respectively corresponding to +π and +π when an inter-channel phase difference of the stereo signal is normalized into a range of −π to +π.

In an exemplary embodiment of the present disclosure, the detection circuitry selects, based on a mean value of first-order differences of an inter-channel phase difference of the stereo signal, a first-order difference of an inter-channel phase difference used for detecting the time change of the inter-channel time difference.

A signal processing method according to an embodiment of the present disclosure includes: detecting, by a signal processing apparatus, a time change of an inter-channel time difference of a stereo signal; and controlling, by the signal processing apparatus, a degree of smoothing of an inter-channel cross correlation, based on the time change of the inter-channel time difference.

The disclosures of U.S. provisional Patent Applications No. 63/138,648, filed on Jan. 18, 2021 and No. 63/141,198, filed on Jan. 25, 2021, and Japanese Patent Application No. 2021-078567, filed on May 6, 2021, including the specifications, drawings and abstracts, are incorporated herein by reference in their entireties.

INDUSTRIAL APPLICABILITY

An exemplary embodiment of the present disclosure is useful for encoding systems and/or the like.

REFERENCE SIGNS LIST

10, **10*a*, 10*b*** ITD estimator
11 FFT unit
12 ICC determiner
13 SFM determiner
14 Smoothing processor
15 IFFT unit
16 ITD detector
50, 60 Single-sound source movement detector
51 IPD determiner
52, 61 Data selector
53 First-order difference determiner
54 Variance determiner
55 Smoothing controller
71 Determiner

The invention claimed is:

1. A signal processing apparatus, comprising:

detection circuitry, which, in operation, detects a time change of an inter-channel time difference of a stereo signal based on an inter-channel phase difference of the stereo signal;

control circuitry, which, in operation, controls a degree of smoothing of an inter-channel cross correlation, based on the time change of the inter-channel time difference; and estimation circuitry, which, in operation, estimates the inter-channel time difference, based on the inter-channel cross correlation for which the degree of smoothing is controlled.

2. The signal processing apparatus according to claim 1, wherein the detection circuitry detects the time change of the inter-channel time difference, based on a first variance of the inter-channel phase difference for a first band of the stereo signal and a second variance of the inter-channel phase difference for a second band of the stereo signal.

3. The signal processing apparatus according to claim 2, wherein the control circuitry determines that a sound source of the stereo signal is moving singly when the first variance and the second variance satisfy a predetermined condition, and performs weakening of the degree of smoothing to less than the degree of smoothing when the predetermined condition is not satisfied.

4. The signal processing apparatus according to claim 3, wherein the weakening of the degree of smoothing includes not executing the smoothing.

5. The signal processing apparatus according to claim 3, wherein:

the second band is higher than the first band, and the predetermined condition is that the first variance is smaller than a first threshold while a ratio of the second variance to the first variance is larger than a second threshold.

6. The signal processing apparatus according to claim 1, wherein the detection circuitry does not use, for detecting the time change of the inter-channel time difference, information on inter-channel phase differences respectively corresponding to +π and −π when the inter-channel phase difference of the stereo signal is normalized into a range of −π to +π.

7. The signal processing apparatus according to claim 1, wherein the detection circuitry selects, based on a mean value of first-order differences of the inter-channel phase difference of the stereo signal, a first-order difference of an inter-channel phase difference used for detecting the time change of the inter-channel time difference.

8. A signal processing method, comprising:

detecting, by a signal processing apparatus, a time change of an inter-channel time difference of a stereo signal based on an inter-channel phase difference of the stereo signal;

controlling, by the signal processing apparatus, a degree of smoothing of an inter-channel cross correlation, based on the time change of the inter-channel time difference; and estimating, by the signal processing apparatus, the inter-channel time difference, based on the inter-channel cross correlation for which the degree of smoothing is controlled.

* * * * *